United States Patent

[11] 3,550,734

| [72] | Inventors | Akibumi Sinoda;<br>Mashahiko Nishii, Chita-gun, Japan |
|---|---|---|
| [21] | Appl. No. | 795,238 |
| [22] | Filed | Jan. 30, 1969 |
| [45] | Patented | Dec. 29, 1970 |
| [73] | Assignee | Toyoda Automatic Loom Works, Ltd.<br>Kariya-she, Aichi-ken, Japan |
| [32] | Priority | Jan. 31, 1968 |
| [33] | | Japan |
| [31] | | No. 43/6130 |

[54] SPEED CHANGE CONTROLLING DEVICE FOR INDUSTRIAL VEHICLE
2 Claims, 5 Drawing Figs.

[52] U.S. Cl. .................................................... 192/4,
    137/637.1
[51] Int. Cl. ..................................................... F16r 31/46,
    F16h 57/10, F16d 67/04
[50] Field of Search .......................................... 74/335,
    473, 334, 344, 364; 137/637, 637.1; 192/4

[56] References Cited
UNITED STATES PATENTS

| 2,299,475 | 10/1942 | Farmer .......................... | 192/4 |
| 2,963,945 | 12/1960 | Barker et al. ................. | 192/4X |
| 3,104,813 | 9/1963 | Baatrup ........................ | 137/637.1X |
| 3,313,181 | 4/1967 | Leonard et al................ | 137/637.1X |
| 3,381,783 | 5/1968 | Brukner ....................... | 192/4 |
| 3,446,320 | 5/1969 | Schott .......................... | 192/4 |

Primary Examiner—Arthur McKeon
Attorney—Blum, Moscovitz, Friedman and Kaplan

ABSTRACT: A speed change controlling device is provided with improved control valve for delivering oil under pressure into the clutch for selecting the gearing of the speed change gears in an industrial vehicle such as a lift truck having speed change gears associated with a torque converter to the effect that a change lever for initiating the effectuation of speed change can be operated only when the footbrake pedal is applied.

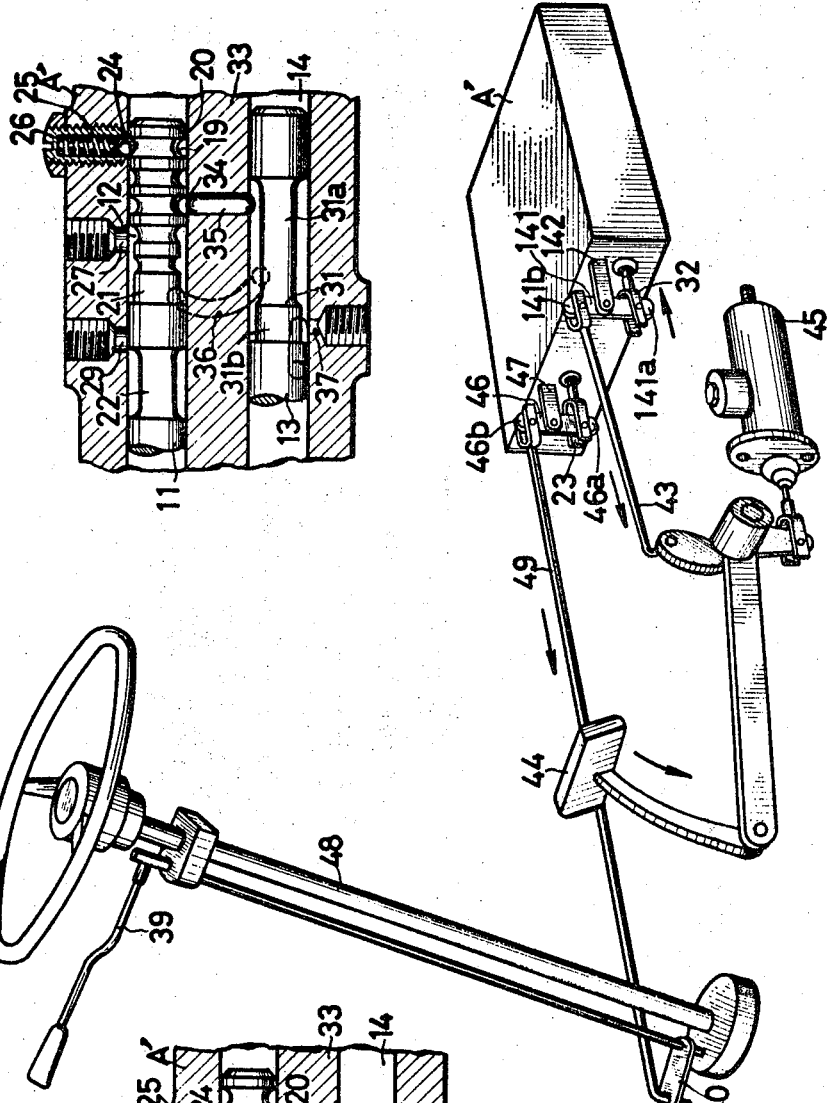

3,550,734

SPEED CHANGE CONTROLLING DEVICE FOR INDUSTRIAL VEHICLE

DETAILED EXPLANATION OF THE INVENTION

The present invention relates to the speed change controlling device of industrial vehicle such as a lift truck having speed change gears associated with the torque converter.

The object of the present invention is to provide a speed change controlling device which is provided with improved control valve for delivering oil under pressure into the clutch for selecting the gearing of the speed change gears in an industrial vehicle such as a lift truck having speed change gears associated with the torque converter to the effect that the change lever for initiating the effectuation of speed change can be operated only when the footbrake pedal is applied.

Another object of the present invention is to prevent the wearing and deterioration of function of the clutch, the torque converter and related mechanisms and to attain the safety of the aforesaid industrial vehicle by preventing the free changing operation of the change lever for switching the direction of the number of the vehicle during the running of the vehicle.

Other objects and features of the present invention will be clarified from the following explanations.

In the conventional vehicles such as lift truck or shovel loader having the speed change gears associated with the torque converter, the switching of the direction of motion of the vehicle can be effectuated during the running of the vehicle by operating change lever alone, but when such a method is employed, an overload is inserted to both the torque converter and a related speed change gears, and as a result, the deterioration of function or damage is developed, which has been the drawback to the effective use of the conventional device.

For example, in a conventional lift truck of the above described type, when the change lever is operated to turn the lift truck backward while it is running forward, the lift truck in starting backward drive generates a dull noise. In this case, at the clutch portion for connecting the torque converter and speed change gears of a lift truck, the torque caused by the inertia of the lift truck moving forwardly and the engine-torque for driving the lift truck backward is multiplied, and the operative condition developed in the working of the clutch becomes so severe that it often exceeds the allowable transmission torque, and the clutch deteriorates rapidly.

In order to withstand said excessive high torque, it is necessary to retain the safety by strengthening the structure of respective members of the driving system, especially the respective gears of front accelerator shaft, differential gear and transmission. Moreover, in regard to the torque converter, when the change lever is operated as mentioned above, the elevation of the temperature or overheating of the oil is incurred because of the frictional heat generated by the rotational change of gears, and it is impossible to avoid the leakage of oil caused by the elevation of internal pressure due to the foaming of the operation oil, and the deterioration of function caused by the reduction of the density of the oil.

The present invention is directed to the elimination of the above-mentioned drawbacks of the conventional devices, and in accordance with the present invention, the change lever is operated only when the footbrake pedal is pushed into the effect that the abrupt switchover of the moving directions during the running of the vehicle can be prevented.

The invention will best be understood from the following descriptions of the specific embodiment taken in connection with the accompanying drawings, in which:

FIG. 2 is a perspective view of the control valve assembly of the present invention;

FIG. 4 is a partially enlarged cross-sectional view of the same showing the position of the normal rotation thereof; and FIG. 5 is a partially enlarged cross-sectional view showing the position of the reverse rotation thereof.

Figure 1:
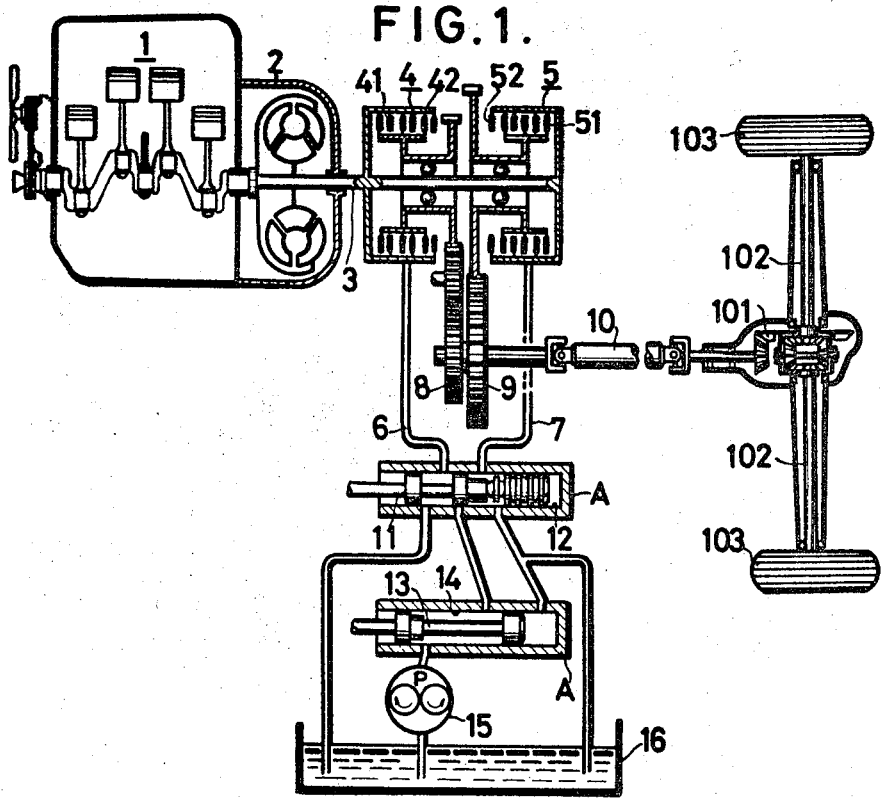
FIG. 1 shows the driving system of lift truck in which the control valve assembly of the present invention is used.

The outline of the driving system of a lift truck provided with the control valve assembly of the present invention is explained about in accordance with FIG. 1.

Torque converter 2 is connected to the engine 1, whereby the rotation of the engine 1 is transmitted to the forward clutch 4 and backward clutch 5 through the output shaft 3 of the torque converter 2, and the clutch plates 41 and 52 on the input side of the two clutches are always synchronously rotated along with the output shaft 3 of the torque converter.

The switching operation of forward clutch 4 and backward clutch 5 is carried out by the operation of the control valve assembly A of the present invention controlling oil flow under pressure respectively in the oil path 6 for supplying the operation oil to the forward clutch 4, and the oil path 7 for supplying operation oil to the backward clutch 5. When the operation oil is supplied to the oil path 6, the clutch plate 41 on the input side of the forward clutch 4 is connected to the clutch plate 42 on the output side to rotate the gears 8 for normal rotation to the effect that the wheel 103 can be driven through the drive shaft 10, differential gear 101, and accelerator shaft 102, whereby the lift truck is driven to forward direction.

On the other hand, when the oil path 6 is closed, and operation oil is supplied to the oil path 7, the input side clutch plate 52 of the backward clutch 5 is connected to the output side clutch plate 51 to rotate the gears 9 for reverse rotation to the effect that the drive shaft 10 is rotated in the opposite direction against direction of the preceding rotation, and the wheel 103 can be driven backward through the differential gear 101 and accelerator shaft 102.

The structure and effects of the control valve assembly A of the present invention are explained in detail later, however, when the present invention is compared with the conventional control valve of the type which has single valve chamber provided with the valve capable of switching optionally the oil path 6 for supplying operation oil to the forward clutch 4 and the oil path 7 for supplying operation oil to the backward clutch even during the running of the vehicle, the following differences are clearly delineated, viz the control valve assembly A of the present invention has the valve chamber 12 (hereinafter called the first valve chamber) having the valve 11 (hereinafter referred to as the first valve) for switching the oil path 6 and the oil path 7, and another valve chamber 14 (hereinafter referred to as the second valve chamber) having another valve 13 (hereinafter referred to as the second valve) for controlling the operation of said first valve 11, provide two chambers forming one control valve assembly A as a whole which does not permit the operation of the first valve 11 during the running of a lift truck, but permits the operation of the first valve 11 in relation to the second valve 13 only when the footbrake pedal is pushed in to operate the second valve 13.

Therefore, the control valve assembly A of the present invention can prevent a number of troubles brought about by the abrupt switchover of the oil path 6 and the oil path 7 during the running of a vehicle.

In FIG. 1, 15 is the oil pump for delivering oil from the oil under pressure tank 16 to the control valve assembly A.

Figure 3:
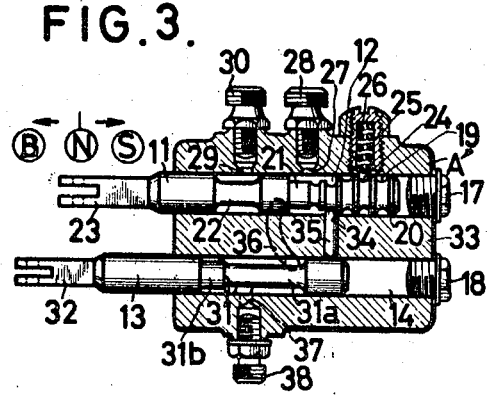
FIG. 3 is a partial cross-sectional view of the control valve assembly of FIG. 2 showing its neutral position.

The following is the detailed explanation of the embodiment of the control valve assembly taken in connection with FIG. 3 through FIG. 5.

In the drawings, FIGS. 3, 4, and 5 A' is the control valve body, and cylindrical first valve chamber 12 and the second valve chamber 14 are parallelly provided in the axial direction within said control valve body A', and one end of each of the chambers 12 and 14 (on the right end in the drawing) is closed by the stoppers 17, 18, respectively, the same being screwed to said control valve body A'. The first valve 11 in the form of a bar having the diameter adapted to the internal diameter of the first valve chamber 12 is inserted in said chamber 12 and allowed to move freely in longitudinal direction thereof. The forward portion of the first valve 11 (on the right side of the drawing) is formed into an essentially continuously knotted portion 20 having ring form knots provided with a plurality of deep grooves 19 in the axial direction, a staged portion 21 being provided close to said continuously knotted portion 20, while the rear end portion of the first valve 11 (on the left side of the drawing) is provided with a staged portion 22, and a U-shaped joint 23 is provided at the end thereof the same being externally projected from the primary valve chamber 12. A steel ball 24 is charged by the spring 26 in the spring chamber 25 screwed through the right side portion of the first valve 12 in the drawing, and is fitted to one of the deep grooves 19 of the continuously knotted portion 20 of the first valve 11 to fix said first valve 11 in a desired position.

On the sidewall of the control valve body A', an oil delivery passage 27 is provided to extend into the central portion of the first valve chamber 12, said passage 27 being connected at one end through the union 28 to the oil path 7 for supplying operation oil to the backward clutch 5 of the speed change gears associated with the torque converter, one end of said passage 28 being open at the staged portion 21 of the first valve 11.

Further, on the same sidewall of the control valve body a', at the left of said passage 27, an oil delivery passage 29 is provided the same being connected at one end through the union 30 to the oil path 6 for supplying the operation oil to the forward clutch 4 of the speed change gears belonging to the torque converter and one end from said passage 29 being opened at the staged portion 22 of the first valve 11.

The second valve 13 in the form of a bar having a diameter corresponding to the inner diameter of the second valve chamber 14, is inserted into the second valve chamber 14 and allowed to move freely in longitudinal direction thereof while a staged portion 31 of said valve 13 is provided approximately in the center thereof the staged portion having intermediate diameter portion 31a and the larger diameter portion 31b connected thereto. A U-shaped joint 32 extends at the end portion of the second valve 13 and projects externally from the second valve chamber 14.

A passage 34 for connecting said two valve chambers 12 and 14 is formed in and passes through the partition wall 33 between the first valve chamber 12 and the second valve chamber 14 in essentially perpendicular direction to the longitudinal direction of said two valve chambers, and a stopper pin 35 is inserted into said passage 34 in the axial direction thereof.

The axial length of said stopper pin 35 is greater than that of said passage 34 so that one end portion of said stopper pin 35 (the upper end or lower end in the drawing) always projects into one or the other of the first valve chamber 12 or the second valve chamber 14, and at the same time, the degree of the projection of the stopper pin 35 from the passage 34 is adjusted to be substantially equal to the depth of the deep groove 19 of the continuous knotted portion 20 of the first valve 11 and the difference between the outer diameter of the intermediate diameter portion 31a of the staged portion of the second valve 13 and the inner diameter of the second valve chamber 14. An oil path 36 is formed in the partition wall 33, which connects the first valve chamber 12 and the second valve chamber 14, and 37 represents an oil absorbing passage extending through the sidewall of the control valve body A', one end of which passage 34 opens to the second valve chamber 14 and the other end thereof is connected through the union 38 to the gear pump 15 for supplying operation oil.

In respect of the embodiment of the present invention in relation to other mechanism as is shown in FIG. 2, numeral 46 is the reverse-lever supported on the supporting plate 47 projected on the left sidewall of the body A', whose lower end 46a is connected to the U-joint 23 of the first valve 11, and whose upper end 46b is interlocked through the link 49 to the interlocking piece 40 of the change lever 39 provided on the steering column 48 of the driver's seat of the lift truck. 141 is the reverse-lever of the second valve 13 supported on the supporting plate 142 projected on the left sidewall of the body A', whose lower end 141a is connected to the U-joint 32 of the second valve 13, and the upper end 141b is connected to the footbrake pedal 44 provided at a part of the body (not shown) through the interlocking link 43. 45 is the master cylinder connected to the footbrake pedal 44.

The effects and functions of the control valve of the embodiment having such a structure as described above are explained in detail in the following paragraphs.

The neutral state of the device is explained mainly in accordance with FIG. 3. In the neutral state, the second valve 13 within the second valve chamber 14 is pulled to the left to open the oil absorbing passage 37, but since the first valve 11 within the first valve chamber 12 is placed on the neutral position N to close the oil path 36, the pressure oil flowing into the second valve chamber 14 through the union 38 does not flow into the first valve chamber 12, whereby the starting movement of the lift truck is prevented.

The footbrake pedal 44 is not depressed in this case, and since the stopper pin 35 which is inserted into the passage 34 of the partition wall 33 is pushed out into the first valve chamber 12 by the second valve 13 to insert its one end into one of the deep grooves 19 of the continuously knotted portion 20 to stop the first valve 11, it is impossible to operate the first valve 11 by activating the change lever 39.

The forward operation is outlined in connection with the showing of FIG. 4. When footbrake pedal 44 is depressed, the second valve 13 is urged to the right through the interlocking link 43 and the reverse lever 141 as is shown in the drawing and the stopper pin 35 in the passage 34 is brought into contact with the intermediate diameter portion 31a of staged portion 31 of the second valve 13 to permit movement into the side of the second valve chamber 14, and therefore lateral movement of the first valve 11 is attained. The oil absorbing passage 37 is closed by the second valve 13.

In this case, when the first valve 11 is pushed into the position of normal drive S from the neutral position N through the interlocking piece 40, the interlocking link 49 and the reverse lever 46 by displacing the change lever 39 into the forward side, the stopper pin 35 having been inserted into one of the deep grooves 19 of the continuously knotted portion 20, is moved in its axial direction by the relative movement with the deep groove 19 to the staged portion 31 of the second valve 13. The first valve 11 is fixed in its position by the steel ball 24 of the spring chamber so as to connect the connecting oil path 36 with the oil passage through the staged portion 22.

Thereafter, when the footbrake pedal 44 is released, the second valve 13 is drawn to the left and the stopper pin 35 is pushed into its axial direction by the change of the position of the intermediate diameter portion 31a of the staged portion 31 and the valve head is inserted into one of the deep grooves 19 of the continuously knotted portion 20 of the first valve 11, and at the same time the oil absorbing passage 37 is opened at the larger diameter portion 31b of the staged portion 31. The pressure oil coming into the oil absorbing passage 37 through the union 38 flows into the space between the second valve chamber 14 and the staged portion 31, and delivered into the forward clutch 4 of the speed change gears through the oil path 36, the staged portion 22 of the first valve 11, oil passage 29, the union 30 and oil path 6, and therefore the lift truck can be forwarded.

Next, the backward running of the lift truck is explained mainly in connection with FIG. 5.

When the footbrake pedal 44 is first depressed to the predetermined position of the second valve 13, the stopper pin 35 in the passage 34 becomes free again and at the same time the oil absorbing passage 37 is closed by the second valve 13, and the lift truck is stopped temporarily.

Next the changer lever 39 is operated to the backward side to pull out the first valve 11 to the reverse drive position B through the interlocked piece 40, the interlocked link 29 and the reverse drive lever 46, the stopper pin 35 having been inserted into one of the deep groove 19 is pushed in its axial direction to be moved into the side of the staged portion 31 of the second valve 13, and at the same time the first valve 11 is positioned by the steel ball 24 of the spring chamber 25, and the oil path 36 and the oil delivery passage 27 are connected by the staged portion 21.

When the footbrake pedal 44 is released, the second valve 13 is again pulled out so that the stopper pin 35 in the passage 34 is inserted into one of the deep grooves 19 of the continuously knotted portion 20 of the first valve 11, and at the same time the oil absorbing passage 37 is opened at the larger diameter portion 31b of the staged portion 31, and therefore the pressure oil coming into the oil absorbing passage 37 through the union 38 flows into the space portion between the second valve chamber 14 and the staged portion 31 and delivered into the backward clutch 5 of the speed change gears through the oil path 36, the staged portion 21 of the first valve 11, the oil passage 27, the union 28, and oil path 7 in order that the lift truck can be driven backward.

As is apparent from the above explanations, when the control valve of the present embodiment is attached to the lift truck having speed change gears with torque converter, the operation of the change lever can be controlled so that the backward and forward drive switchover cannot be abruptly made during the running of the lift truck, and said switchover can be made only when the footbrake pedal is depressed.

In other words, the backward and forward drive switchover can be done only when the lift truck is once stopped so as to eliminate the inertia of the lift truck generated during its running, and therefore the above-mentioned drawbacks of the conventional lift truck can be removed.

In summary, the characteristics of the speed change controlling device of the present invention reside in that in an industrial vehicle such as a lift truck having speed change gears with torque converter, the control valve body for delivering oil to the clutch which is to select the gearing of the speed change gears contains two valve chambers parallel to each other, in the first valve chamber there provided the first valve which has staged portion selectively faced to the oil delivery passage and has the continuously knotted portion in continuation thereof, in the second valve chamber there provided the second valve which has staged portion, and the connecting passage extending through the partition wall between said first valve chamber and second valve chamber, in which the stopper pin is inserted, whereby engagement and disengagement of said pin to and from the continuously knotted portion of said first valve is controlled by the staged portion of said second valve.

Therefore, in case said first valve is interlocked to the change lever for switchover of a lift truck and said second valve is interlocked to the footbrake pedal of the same, when the lift truck is stopped by actuating the footbrake, the position of the first valve is freely set in normal drive, neutral and reverse drive by the operation of the change lever because said stopper pin is free to move and project to the staged portion of the second valve. When the footbrake is released after the first valve is once set as above mentioned, the second valve actuates to push said stopper pin into the deep groove of the continuously knotted portion of the first valve so that the movement of the first valve, i.e., the free operation of the change lever is prevented, it is necessary to push in the footbrake pedal in order to operate the change lever.

Thus, in accordance with the present invention, it is possible to previously prevent the overload given to the driving mechanism and the deterioration of functions of torque converter and the speed change mechanisms of a lift truck, which are caused in the conventional mechanism when change lever is operated suddenly during running of the truck. Thus, the present invention is practically desirable as the speed change controlling device in an industrial vehicle such as a lift truck having speed change gears associated with a torque converter.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

We claim:

1. A speed change controlling device for an industrial vehicle consisting of a torque converter, a drive shaft, a plurality of speed change gears associated with the drive shaft for selectively driving said shaft for forward or backward directional movement of the vehicle, a brakepedal, and a gear change lever operable when said brakepedal is applied, forward and backward clutches selectively connecting one of said speed change gears with the output shaft of said torque converter, an oil reservoir, a control valve body for delivering oil under pressure from said oil reservoir to one of said clutches for actuating the same to select the one gear of said speed change gears, first and second valve chambers separated by a partition and being parallelly disposed in the axial direction of and within said control valve body, a first valve operably disposed in the axial direction of and within said first valve chamber and being operable upon activation of the gear change lever for the changing gears to deliver oil to the selected one of said respective clutches, said first valve having a continuously knotted portion incorporating spaced rings providing a plurality of grooves in the axial direction, a second valve operably disposed in the axial direction of and within said second valve chamber and being operated upon application of the brakepedal, said second valve having a staged portion of reduced diameter, a connecting passage extending through the partition between said first and second valve chambers, and a movable stopper pin disposed within said connecting passage, and engageable at its opposed positions of movement with respect to the knotted portion of said first valve and the staged portion of said second valve.

2. A speed change controlling device for an industrial vehicle consisting of a torque converter, a drive shaft, a plurality of speed change gears associated with the drive shaft for selectively driving the latter drive shaft for forward or backward directional movement of the vehicle, a brakepedal, and a gear change lever operable when same brakepedal is activated, forward and backward clutches selectively connecting one of said speed change gears with the output shaft of said torque converter, a control valve body for delivering oil under pressure to one of said clutches operable to select the gearing of said speed change gears, first and second valve chambers separated by a partition and being parallelly disposed in the axial direction of and within said control valve body, a first valve operably disposed in the axial direction of and within said first valve chamber and being operated upon activation of the gear change lever for the changing gears to deliver oil to one of said respective clutches, said first valve having a continuously knotted portion incorporating spaced rings providing a plurality of grooves in the axial direction, a second valve operably disposed in the axial direction of and within said second valve chamber and being operated upon a direction of the brakepedal, said second valve having a staged portion of reduced diameter substantially in its center, a connecting passage extending through the partition between said first and second valve chambers, and a movable stopper pin disposed within said connecting passage and engageable at its opposed positions of movement respectively by such knotted and staged valve portions, the movement for engagement and disengagement of said stopper pin with respect to the continuously knotted portion of said first valve being controlled by the movement of the staged portion of said second valve.